United States Patent
Hill et al.

(10) Patent No.: US 10,793,126 B2
(45) Date of Patent: Oct. 6, 2020

(54) ELECTRO-HYDRAULIC BRAKE SYSTEM AND METHOD

(71) Applicant: CNH Industrial America LLC, New Holland, PA (US)

(72) Inventors: Christopher B. Hill, Chicago, IL (US); Jerry L. Brinkley, Woodbridge, IL (US); David Dean Flamme, Winfield, IL (US); Kenneth Rolette McCabe, Romeoville, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/845,560

(22) Filed: Dec. 18, 2017

(65) Prior Publication Data
US 2019/0184952 A1    Jun. 20, 2019

(51) Int. Cl.
| | | |
|---|---|---|
| *B60T 11/20* | (2006.01) | |
| *B60T 8/58* | (2006.01) | |
| *B60T 8/26* | (2006.01) | |
| *B60T 13/68* | (2006.01) | |
| *B60T 13/66* | (2006.01) | |
| *B60T 8/17* | (2006.01) | |
| *B60T 8/36* | (2006.01) | |

(52) U.S. Cl.
CPC ............... *B60T 8/58* (2013.01); *B60T 8/17* (2013.01); *B60T 8/26* (2013.01); *B60T 13/662* (2013.01); *B60T 13/686* (2013.01); *B60T 8/3605* (2013.01); *B60T 2250/04* (2013.01)

(58) Field of Classification Search
CPC ...... B60T 8/17; B60T 8/26; B60T 8/58; B60T 13/662; B60T 13/686; B60T 8/3605; B60T 2250/04; B60T 11/21; B60T 11/203; B60D 11/08
See application file for complete search history.

(56) References Cited

U.S. PATENT DOCUMENTS

| | | | |
|---|---|---|---|
| 3,863,991 A | 2/1975 | Wilson | |
| 4,583,788 A | 4/1986 | Rubenstein | |
| 4,809,586 A | 3/1989 | Gage et al. | |
| 4,953,917 A * | 9/1990 | Wittich | B60T 11/21 188/16 |

(Continued)

FOREIGN PATENT DOCUMENTS

FR    2931764 A1    12/2009

*Primary Examiner* — Thomas W Irvin
(74) *Attorney, Agent, or Firm* — Rickard K. DeMille; Rebecca L. Henkel

(57) ABSTRACT

An electro-hydraulic brake system includes a first brake input that generates a first brake input signal and a second brake input that generates a second brake input signal. The system also includes a first valve that releases hydraulic fluid to control a first brake and a second valve that releases the hydraulic fluid to control a second brake. The system includes a speed sensor that generates a speed signal indicative of a speed of a work vehicle. A controller receives the speed signal, the first brake input signal, and the second brake input signal, determines the speed of the work vehicle based on the speed signal, and compares the speed of the work vehicle to a threshold speed. The controller synchronizes actuation of the first and second valves in response to the speed being in excess of the threshold speed to control the first and second valves.

20 Claims, 4 Drawing Sheets

(56) References Cited

U.S. PATENT DOCUMENTS

| | | | |
|---|---|---|---|
| 5,445,445 A | 8/1995 | Yukio | |
| 5,472,264 A | 12/1995 | Klein et al. | |
| 5,823,636 A | 10/1998 | Parker et al. | |
| 5,895,098 A | 4/1999 | Stacey et al. | |
| 5,979,999 A | 11/1999 | Poertzgen et al. | |
| 6,592,190 B2 | 7/2003 | Dunbar et al. | |
| 6,729,132 B2 | 5/2004 | Batchelor et al. | |
| 6,860,569 B1 | 3/2005 | Campau et al. | |
| 7,191,862 B2 | 3/2007 | Wattenburg et al. | |
| 7,448,697 B2 | 11/2008 | Brancolini | |
| 9,022,487 B2 * | 5/2015 | Brinkley | B62D 11/08 180/6.3 |
| 10,315,635 B2 * | 6/2019 | Zust | B60T 11/203 |
| 2011/0160971 A1 | 6/2011 | Crombez | |
| 2013/0038118 A1 * | 2/2013 | Brinkley | B62D 11/08 303/9.62 |
| 2018/0050676 A1 * | 2/2018 | Zust | B60T 11/203 |

* cited by examiner

ELECTRO-HYDRAULIC BRAKE SYSTEM AND METHOD

BACKGROUND

The present disclosure generally relates to a brake system.

The speed of a vehicle is typically controlled through a combination of power production by the engine, power transfer from the engine to the wheels/tracks through a transmission, and use of a brake system. Some vehicles (e.g., tractors, harvesters, etc.) may include multiple brake inputs that enable independent control of different brakes or sets of brakes on the vehicle. For example, some vehicles may include a first brake input that enables an operator to control the brakes on the left side of the vehicle and a second brake input that enables the operator to control the brakes on the right side of the vehicle. However, when the vehicle is moving above a certain speed, independent actuation of both brakes may result in uneven braking by the left and right side brakes causing the vehicle to pull/turn to the left or to the right.

BRIEF DESCRIPTION

The present disclosure relates to an electro-hydraulic brake system. The electro-hydraulic brake system includes a first brake input that generates a first brake input signal and a second brake input that generates a second brake input signal. The system also includes a first valve that releases hydraulic fluid to control a first brake and a second valve that releases the hydraulic fluid to control a second brake. The system includes a speed sensor that generates a speed signal indicative of a speed of a work vehicle. A controller receives the speed signal, the first brake input signal, and the second brake input signal, determines the speed of the work vehicle based on the speed signal, and compares the speed of the work vehicle to a threshold speed. The controller may then synchronize actuation of the first and second valves in response to the speed being in excess of the threshold speed to control the first and second valves The present disclosure also relates to an electro-hydraulic brake system that includes a first valve that releases a hydraulic fluid to control a first brake and a second valve that releases the hydraulic fluid to control a second brake. The system includes a spool valve fluidly coupled to the first valve and to the second valve. The spool valve releases the hydraulic fluid to the first and/or second valves in response to a respective first brake input and a second brake input. A controller receives a first brake input signal and a second brake input signal and opens and/or closes the first and second valves in response to the respective first and second brake input signals.

The present disclosure also relates to at least one tangible non-transitory computer readable medium that includes instructions for a work vehicle controller. The instructions include selectively receiving a first brake input signal and second brake input signal from a respective first brake input and a second brake input, actuate a first valve in response to receiving the first brake input signal. The first valve releases a fluid to drive a first brake. Actuate a second valve in response to receiving the second brake input signal. The second valve releases the fluid to drive a second brake. The instructions then determine if a speed of a work vehicle is above a threshold speed and synchronizes actuation of the first and second valves to simultaneously actuate a first brake and a second brake in response to the speed of the work vehicle being in excess of the threshold speed.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Figure 1:
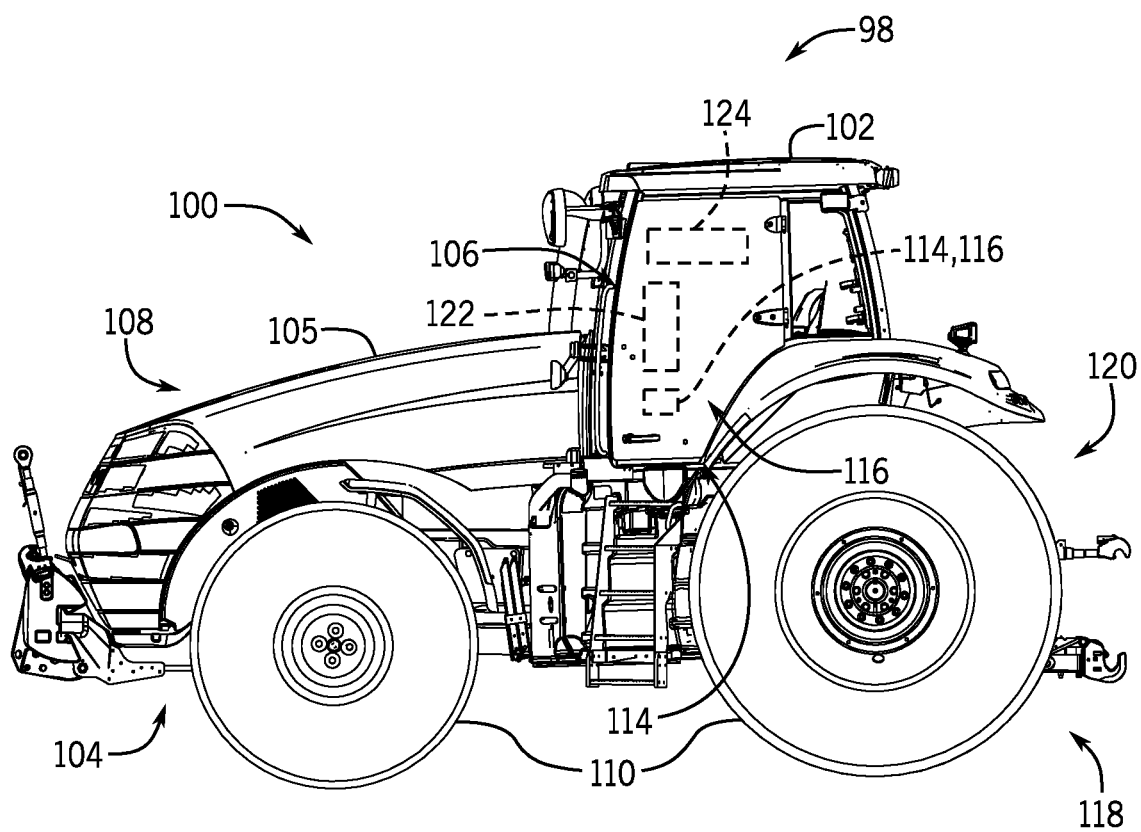
FIG. 1 is a side view of an embodiment of a work vehicle that uses an electro-hydraulic brake system.

FIG. 1 is a side view of an embodiment of a work vehicle 98 that uses an electro-hydraulic brake system 100. In the illustrated embodiment, the work vehicle 98 using the electro-hydraulic brake system 100 is a tractor. However, it should be understood that the electro-hydraulic brake system 100 may be used on other types of work vehicles, such as harvesters, construction equipment, etc. In the illustrated embodiment, the work vehicle 98 includes a cab 102 supported by a chassis 104. The chassis 104 may also support a motor 105 (e.g., diesel engine, etc.), the electro-hydraulic brake system 100, a steering control system 106, a hydraulic system 108 (e.g., including a pump, valves, a reservoir, etc.), and other components (e.g., an electrical system, a cooling system, etc.) that facilitate operation of the work vehicle 98. In operation, the wheels 110 may be driven to rotate by the motor 105 and/or by component(s) of the hydraulic system 108 (e.g., hydraulic motor(s), etc.). While the illustrated work vehicle 98 includes wheels 110, it should be appreciated that in alternative embodiments, the work vehicle 98 may include tracks or a combination of wheels and tracks.

In order to control the speed of the work vehicle 98 as well as facilitate steering, the work vehicle 98 includes the electro-hydraulic brake system 100. The electro-hydraulic brake system 100 includes a first brake input 114 (e.g., brake pedal) and a second brake input 116 (e.g., brake pedal) capable of independently actuating different brakes or sets of brakes on the work vehicle 98. For example, actuating the first brake input 114 may actuate first brake(s) 118 on a left side of the work vehicle 98, while the second brake input 116 may actuate brake(s) 120 on a right side of the work vehicle 98. The ability to independently control different brakes (e.g., first and second brakes 118, 120) enables an operator to use the brakes as part of the steering control system 106 to turn the work vehicle 98. For example, the operator 112 may actuate the first brake(s) 118 on the left side of the work vehicle 98 to facilitate turning the work vehicle to the left. Likewise, an operator may use the second brake input 116 to actuate the brakes 120 on the right side of the work vehicle 98 to facilitate a turn to the right. In some embodiments, a steering input 122 (e.g., steering wheel) may also control actuation of the first and second brakes 118, 120. For example, the steering input 122 may be coupled (e.g., electronically coupled, mechanically coupled) to the first brakes 118 (e.g., left side brakes) and the second brakes 120 (e.g., right side brakes) so that changes in the steering input 122 automatically actuate the first and second brakes 118, 120.

However, if the work vehicle is moving above a certain speed, independent actuation of the first and second brakes 118, 120 may cause the work vehicle 98 to unintentionally pull (i.e., turn) to the left or right in the direction of travel. As will be discussed in detail below, the electro-hydraulic brake system 100 automatically actuates both first and second brakes 118, 120 when the work vehicle 98 is moving faster than a threshold speed when both pedals are depressed simultaneously, when one pedal is pushed, or both pedals are pushed to reduce and/or block pulling/turning.

As illustrated, the work vehicle 98 includes a cab 102 for housing an operator. Inside of the cab 102 are various controls that facilitate control of the work vehicle 98, such as the steering input 122. In some embodiments, the work vehicle 98 may include a user interface 124 inside the cab 102 that provides feedback to and receives input from the operator. For example, the user interface 124 may enable an operator to adjust the threshold speed for simultaneous actuation of the first and second brakes 118, 120. In some embodiments, the user interface 124 may notify the operator that the work vehicle 98 is operating above the threshold speed and that use of either first or second brake inputs 114, 116 will simultaneously actuate the first and second brakes 118, 120. The user interface may also provide this information using a display that displays indicator light(s) or visual symbols (e.g., symbol, written message, etc.). In some embodiments, the user interface 124 may include an audio output (e.g. speakers) that emits an audio indication (e.g., beeping, siren, warning tone, spoken message, etc.).

Figure 2:
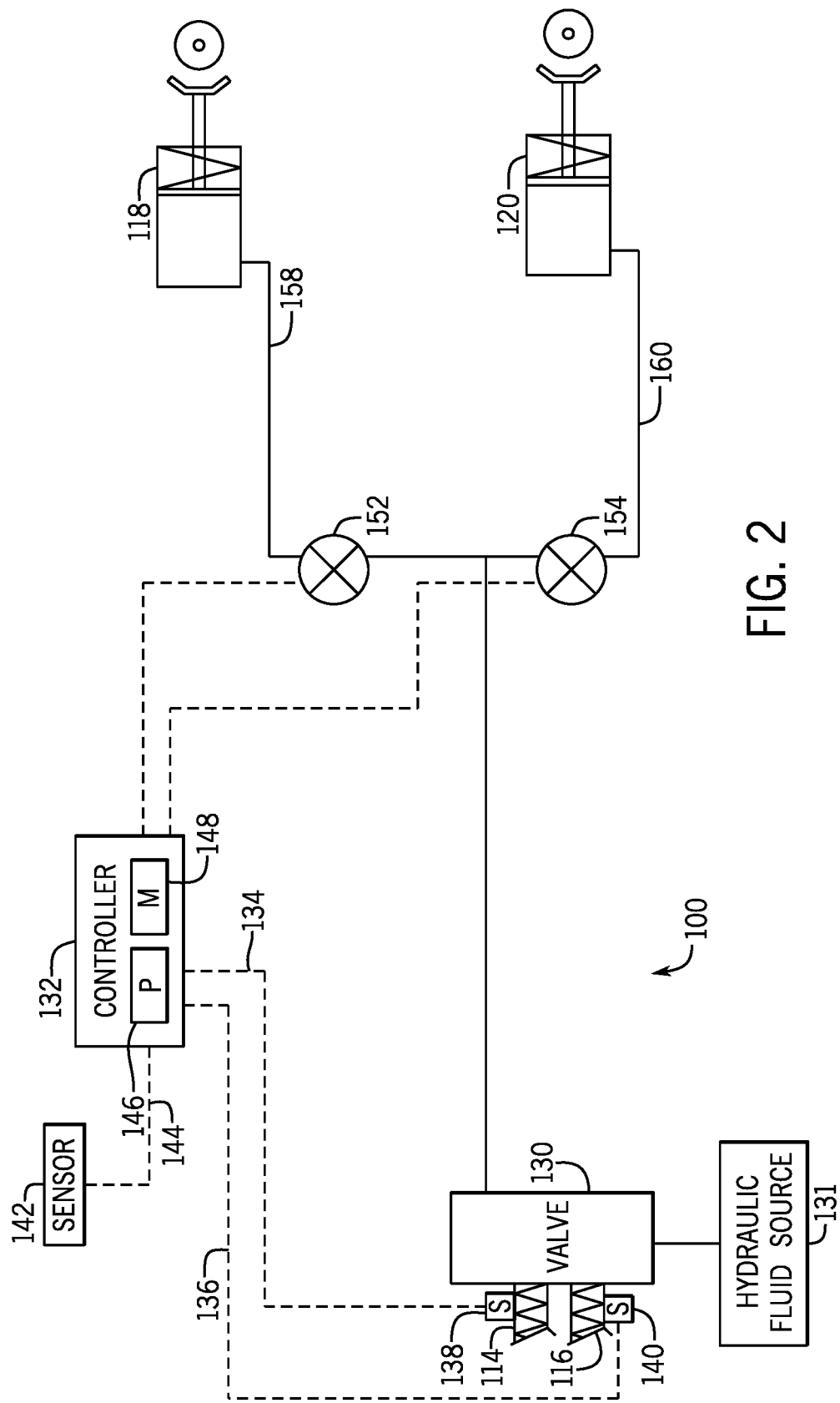
FIG. 2 is a schematic view of an embodiment of an electro-hydraulic brake system.

FIG. 2 is a schematic view of an embodiment of an electro-hydraulic brake system 100. The electro-hydraulic brake system 100 includes the first and second brake inputs 114, 116 (e.g., brake pedals) that couple to a valve 130 (e.g., spool valve). The first and second brake inputs 114, 116 are mechanically coupled to the valve 130 so that actuation of the first and second brake inputs 114, 116 actuates the valve 130. The valve 130 is configured to control the flow of pressurized hydraulic fluid from a hydraulic fluid source 131 to the first and second brakes 118, 120. As illustrated, use of either brake input 114, 116 releases hydraulic fluid toward the first and second brakes 118, 120. In addition, to releasing pressurized hydraulic fluid from the valve 130, the first and second brake inputs 114, 116 send respective first and second brake signals 134, 136 to the controller 132. These first and second brake signals 134, 136 indicate actuation of the first and second brake inputs 114, 116, respectively, and in some embodiments the amount of actuation (e.g., how far the brake pedal is depressed). In other words, the first and second brake input signals 134, 136 may vary based on the degree of actuation of the first and second brake inputs 114, 116. For example, the first brake input signal 134 may continuously change as the operator pushes a left brake pedal from a non-actuated state to a fully actuated state. To measure the amount of actuation, the first and second brake inputs 114, 116 may include respective sensors 138, 140. The sensors 138, 140 may be potentiometers, LUVT, Hall Effect sensors, etc. In operation, the sensors 138, 140 generate the respective first and second brake signals 134, 136 indicative of actuation of the first and second brake inputs 114, 116.

As explained above, the electro-hydraulic brake system 100 detects the speed of the work vehicle 98 and in response may synchronize actuation of the first and second brakes 118, 120 (i.e., simultaneous actuation) regardless of which brake input 114, 116 is being used. For example, if the electro-hydraulic brake system 100 determines that the work vehicle 98 is operating above a threshold speed and the operator actuates the first brake input 114, the electro-hydraulic brake system 100 actuate(s) both first and second brakes 118, 120 Likewise, if the electro-hydraulic brake system 100 determines that the work vehicle 98 is operating above a threshold speed and the operator actuates the second brake input 116, the electro-hydraulic brake system 100 actuate(s) both first and second brakes 118, 120. To detect the speed of the work vehicle 98, the electro-hydraulic brake system 100 includes a speed sensor 142 that generates a speed signal 144 indicative of the speed of the work vehicle 98. The speed signal 144 is received and used by the controller 132 to determine whether the speed of the work vehicle 98 is above a threshold level (e.g., 25 mph, 30 mph, 35 mph) and in response synchronizes actuation of the first and second brakes 118, 120 when the first and/or second brake input 114, 116 is actuated.

Coupling (i.e., synchronizing) and decoupling the first and second brakes 118, 120 enables the work vehicle 98 to appropriately brake in different modes of operation. For example, the work vehicle 98 may operate in an environment where lower speeds and tighter turns are desirable such as within a field. This mode of operation may be referred to as a work mode. The work vehicle 98 may also travel along roads (e.g., between fields, towns) where increased speed is desirable to save time, fuel, etc. This mode of operation may be referred to as a travel mode. While operating in a work mode where lower speeds and tighter turns are desirable, the electro-hydraulic brake system 100 enables an operator to independently actuate different brakes/sets of brakes (i.e., decouples the brakes) on opposing sides of the work vehicle 98 to facilitate turning. For example, the operator may use the first brake input 114 to actuate the brakes on the left side of the work vehicle 98 which facilitates turning the work vehicle 98 to the left (i.e., tighter turns to the left). Likewise, when turning to the right the operator may engage the second brake input 116 to facilitate turning the work vehicle 98 to the right (i.e., tighter turns to the right). In contrast, simultaneous engagement of the first and second brake inputs 114, 116 may inhibit tighter turns of the work vehicle 98. However, when operating the work vehicle 98 on roads at higher speeds (i.e., travel mode), independent actuation of the first and second brakes 118, 120 on opposite sides of the work vehicle 98 may be undesirable because it may cause the work vehicle 98 to pull/turn the work vehicle 98 out of its lane, etc. By monitoring the speed of the work vehicle 98 with the speed sensor 142, the controller 132 may determine the operating mode of the work vehicle 98 and thus couple (i.e., synchronize) or decouple the brakes. In this way, the electro-hydraulic brake system 100 facilitates turning (e.g., tighter turns) of the work vehicle 98 when operating in a work mode as well as appropriate braking in a travel mode.

In the illustrated embodiment, the controller 132 includes a processor 146, such as the illustrated microprocessor, and a memory device 148. The controller 132 may also include one or more storage devices and/or other suitable components. The processor 146 may be used to execute software, such as software for controlling the electro-hydraulic brake system 100, and so forth. Moreover, the processor 146 may include multiple microprocessors, one or more "general-purpose" microprocessors, one or more special-purpose microprocessors, and/or one or more application specific integrated circuits (ASICS), or some combination thereof. For example, the processor 146 may include one or more reduced instruction set (RISC) processors.

The memory device 148 may include a volatile memory, such as random access memory (RAM), and/or a nonvolatile memory, such as read-only memory (ROM). The memory device 148 may store a variety of information and may be used for various purposes. For example, the memory device 148 may store processor executable instructions (e.g., firmware or software) for the processor 146 to execute, such as instructions for controlling the electro-hydraulic brake system 100, and so forth. The storage device(s) (e.g., nonvolatile memory) may include ROM, flash memory, a hard drive, or any other suitable optical, magnetic, or solid-state storage medium, or a combination thereof. The storage device(s) may store data, instructions (e.g., software or firmware for controlling the independent brake system), and any other suitable data The controller 132 is configured to receive the first brake input signal 134 and the second brake input signal 136, process data from the first and second brake input signals 134, 136, and in response control actuation of the first and second brakes 118, 120. More specifically, the controller 132 controls the amount of hydraulic fluid to the first and second brakes 118, 120 by sending signals to respective first and second solenoid valves 152 and 154. The first and second solenoid valves 152 and 154 open, close, partially open, and partially close in response to these signals. As the first and second solenoid valves 152, 154 actuate they control the flow of pressurized hydraulic fluid to and thus actuation of the first and second brakes 118, 120. As illustrated, the first solenoid valve 152 controls the flow of hydraulic fluid to the first brake(s) 118, while the second solenoid valve 154 control the flow of hydraulic fluid to the brake(s) 120. In some embodiments, controller 132 either completely opens or completely closes the solenoid valves 152, 154 while the valve 131 (i.e., spool valve) controls the amount of hydraulic fluid flow to the respective first and second solenoid valves 152, 154.

As explained above, when the work vehicle 98 operates below a threshold speed, the controller 132 enables independent actuation of the first and second brakes 118, 120 with the first and second brake inputs 114, 116. That is, the electro-hydraulic brake system 100 enables an operator to selectively control different brakes/sets of brakes to facilitate turning.

However, if the work vehicle 98 is operating above a threshold speed and thus in travel mode, the controller 132 overrides independent actuation of the first and second brake inputs 114, 116 in order to synchronize actuation of the first and second solenoid valves 152 and 154 and thus actuation of the first and second brakes 118, 120. In some embodiments, the controller 132 may take into account actuation of the first and second brake inputs 114, 116 in determining how far to open the solenoid valves 152, 154 when synched. For example, if the operator fully actuates the first brake input 114 and only halfway actuates the second brake input 116, the controller 132 may open both the first and second solenoid valves 154, 156 three quarters of the way. In some embodiments, the controller 132 may use whichever brake input 114 or 116 is actuated the most in determining how far to open the solenoid valves 152, 154. For example, if the operator fully actuates the first brake input 114 and only halfway actuates the second brake input 116, the controller 132 may completely open both the first and second solenoid valves 154, 156 based on the first brake input 114 being completely actuated. In some embodiments the opposite may occur. That is, if the operator fully actuates the first brake input 114 and only halfway actuates the second brake input 116, the controller 132 may open both the first and second solenoid valves 154, 156 halfway based on the first brake input 114 being halfway actuated. Regardless of the algorithm(s) used, the controller 132 enables synchronizing of the first and second solenoid valves 152, 154 (e.g., open, close, partially open, partially close) to facilitate equal or near equal braking by the first and second brakes 118, 120 when the work vehicle is operating in a travel mode.

Figure 3:
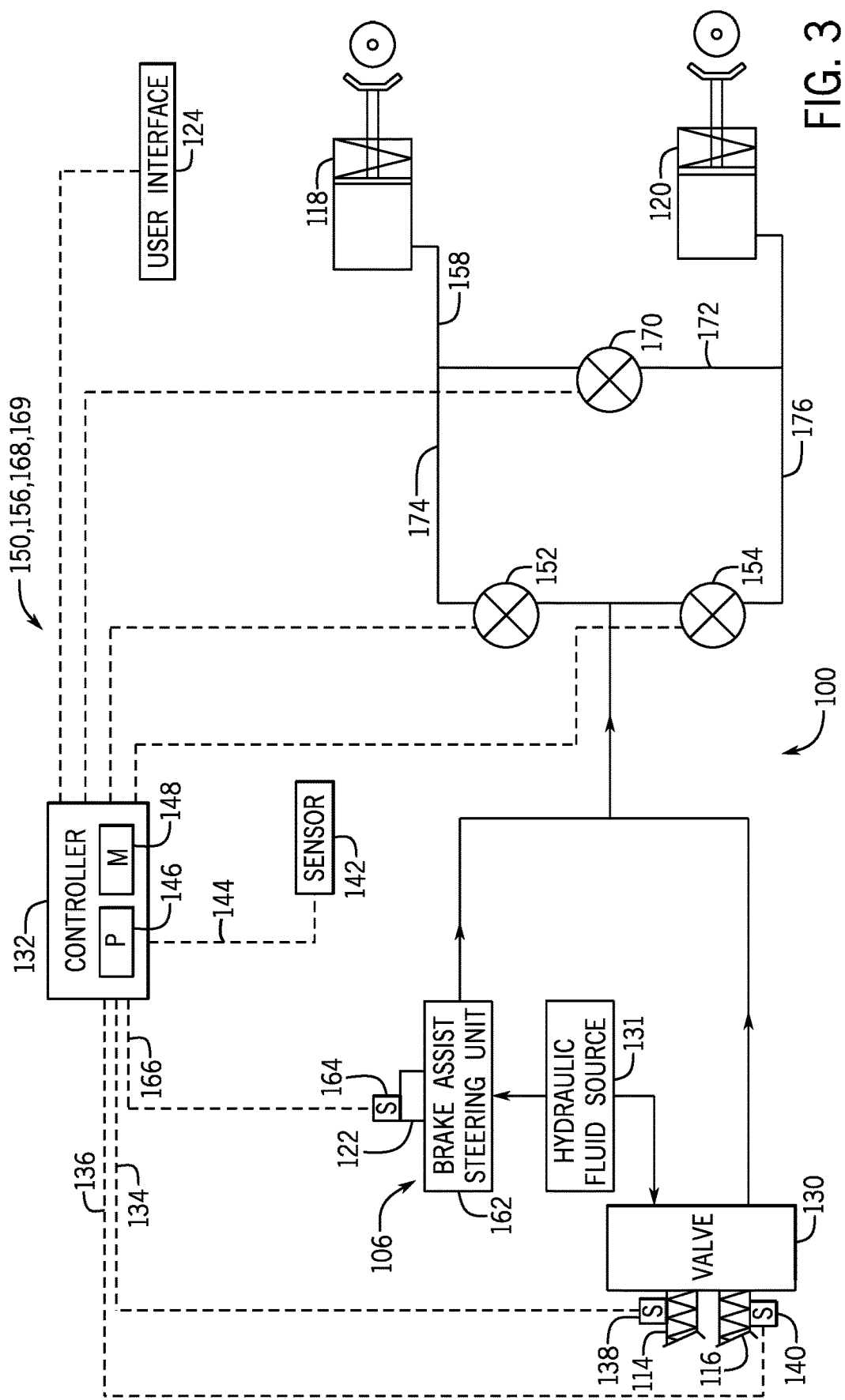
FIG. 3 is a schematic view of another embodiment of an electro-hydraulic brake system.

FIG. 3 is a schematic view of another embodiment of an electro-hydraulic brake system 100. The electro-hydraulic brake system 100 is similar to that illustrated in FIG. 2, and enables the steering control system 106 to control the first and second brakes 118, 120 along with the first and second brake inputs 114, 116. As explained above, the steering control system 106 includes the steering input 122 (e.g., steering wheel). In operation, an operator uses the steering input 122 to turn the wheels 110, which controls the direction of travel of the work vehicle 98. To facilitate turning of the work vehicle 98, the steering control system 106 couples to the electro-hydraulic brake system 100 with a brake assist steering unit 162 (e.g., solenoid valve). In operation, the brake assist steering unit 162 releases or blocks the flow of pressurized hydraulic fluid from the hydraulic source 131 in response to input from the steering input 122. For example, if the steering input 122 were a steering wheel, the rotation of the steering wheel to the left or right would enable the brake assist steering unit 162 to release hydraulic fluid for use by the first or second brakes 118, 120 respectively. The first and second brakes 118, 120 may in turn facilitate turning of work vehicle 98 by resisting/blocking rotation of the wheels 110 on the left and/or right side of the work vehicle 98. In other words, the steering input 122 would enable control of the first and second brakes 118, 120 to facilitate turning without use of the first and second brake inputs 114, 116.

As the brake assist steering unit 162 releases hydraulic fluid in response to movement of the steering input 122, a sensor 164 (e.g., position sensor) sends a signal 166 indicative of a position of the steering input 122 to the controller 132. The controller 132 processes signal 166 and in response sends respective signals 168 and 169 to the solenoid valves 152, 154. The solenoid valves 152, 154 in turn respectively open, close, partial open, or partial close in response to the signals 168, 169 to control the flow of hydraulic fluid to the first and second brakes 118, 120. For example, when the operator 112 turns left with the steering input 122, the sensor 164 transmits the signal 166 indicative of the left turn. The controller 132 may then send signals 168, 169 to the respective solenoid valves 152, 154 to open the solenoid valve 152 and to close the solenoid valve 154. With the solenoid valve 152 open, hydraulic fluid actuates the first brakes 118 on the left side of the work vehicle 98 facilitating the left hand turn.

In some embodiments, the controller 132 may use feedback from the first and second brake inputs 114, 116 in combination with the steering input 122 to control the operation of the first and second brakes 118, 120. That is, the controller 132 may take into account actuation of the first and/or second brake inputs 114, 116 in combination with the steering input 122 in determining how to actuate the solenoid valves 152, 154 (e.g., open, close, partially open, partially close). For example, if the operator fully actuates the first brake input 114, actuates the second brake input 116 halfway, and turns left with the steering input 122, the controller 132 may completely open the first solenoid valve 154 and open the second solenoid valve 156 a quarter of its maximum.

In some embodiments, the controller 132 may also disable the brake assist steering unit 162 when the controller 132 is actively receiving the first and second brake input signals 134, 136. That is, the controller 132 may ignore feedback from the steering input 122 when receiving feedback from the first and/or second brake inputs 114, 116.

As explained above, the electro-hydraulic brake system 100 detects speed of the work vehicle 98 using speed sensor 142 to determine if the work vehicle 98 is operating in a travel mode. If the controller 132 determines that the work vehicle 98 is operating in a travel mode, the controller 132 ignores the signal 166 and/or disables the brake assist steering unit 162 when synchronizing actuation of the first and second brakes 118, 120 (i.e., simultaneous actuation). This enables the first and second brakes 118, 120 to provide the same or nearly the same braking power when the work vehicle 98 is in the travel mode.

In FIG. 3, the electro-hydraulic brake system 100 includes a third solenoid valve 170 hydraulically coupled to the first and second solenoid valves 152, 154. In operation, the third solenoid valve 170 enables hydraulic fluid flow passing through the first solenoid valve 152 to control the second brakes 120 as well as hydraulic fluid flow flowing through the second solenoid valve 154 to control the first brakes 118. In other words, the third solenoid valve creates a flow path 172 (i.e., third flow path) between a first flow path 174 that feeds hydraulic fluid to the first brakes 118 from first solenoid valve 152 and a second flow path 176 that feeds hydraulic fluid to the second brakes 120 from the second solenoid valve 154. The ability to direct hydraulic fluid passing through the first solenoid valve 152 to the second brakes 120 and hydraulic fluid passing through the second solenoid valve 154 to the first brakes 118 facilitates control of the first and second brakes 118, 120 in a variety of situations.

In some embodiments, when the work vehicle 98 is operating in a work mode the third solenoid valve 170 remains closed enabling the first and second brakes 118, 120 to operate independently. As explained above, independent actuation of the first and second brakes 118, 120 enables the work vehicle 98 to use the first and second brakes 118, 120 to facilitate turning. However, when the work vehicle 98 transitions from a work mode to a travel mode, the third solenoid valve 170 opens enabling fluid communication between the first and second flow paths 174, 176. In this way, the third solenoid valve 170 may equalize fluid pressure between first and second flow paths 174, 176 facilitating uniform actuation of the first and second brakes 118, 120. In some embodiments, the third solenoid valve 170 opens in the work mode when both the first and second brake inputs 114, 116 are actuated in order to equalize pressure between the first and second flow paths 174, 176.

In some embodiments, the third solenoid valve 170 may also operate as a fail-safe in the event either the first or second solenoid valves 152, 154 malfunction. For example, if the second solenoid valve 154 fails in a closed position, the controller 132 may control the third solenoid valve 170 to ensure that hydraulic fluid reaches the second brakes 120. Likewise, if the first solenoid valve 152 fails in a closed position, the controller 132 may control the third solenoid valve 170 to ensure that hydraulic fluid reaches the first brakes 118. In some embodiments, the controller 132 may also partially open or partially close the third solenoid valve in response to input from the first and second brake inputs 114, 116.

Figure 4:
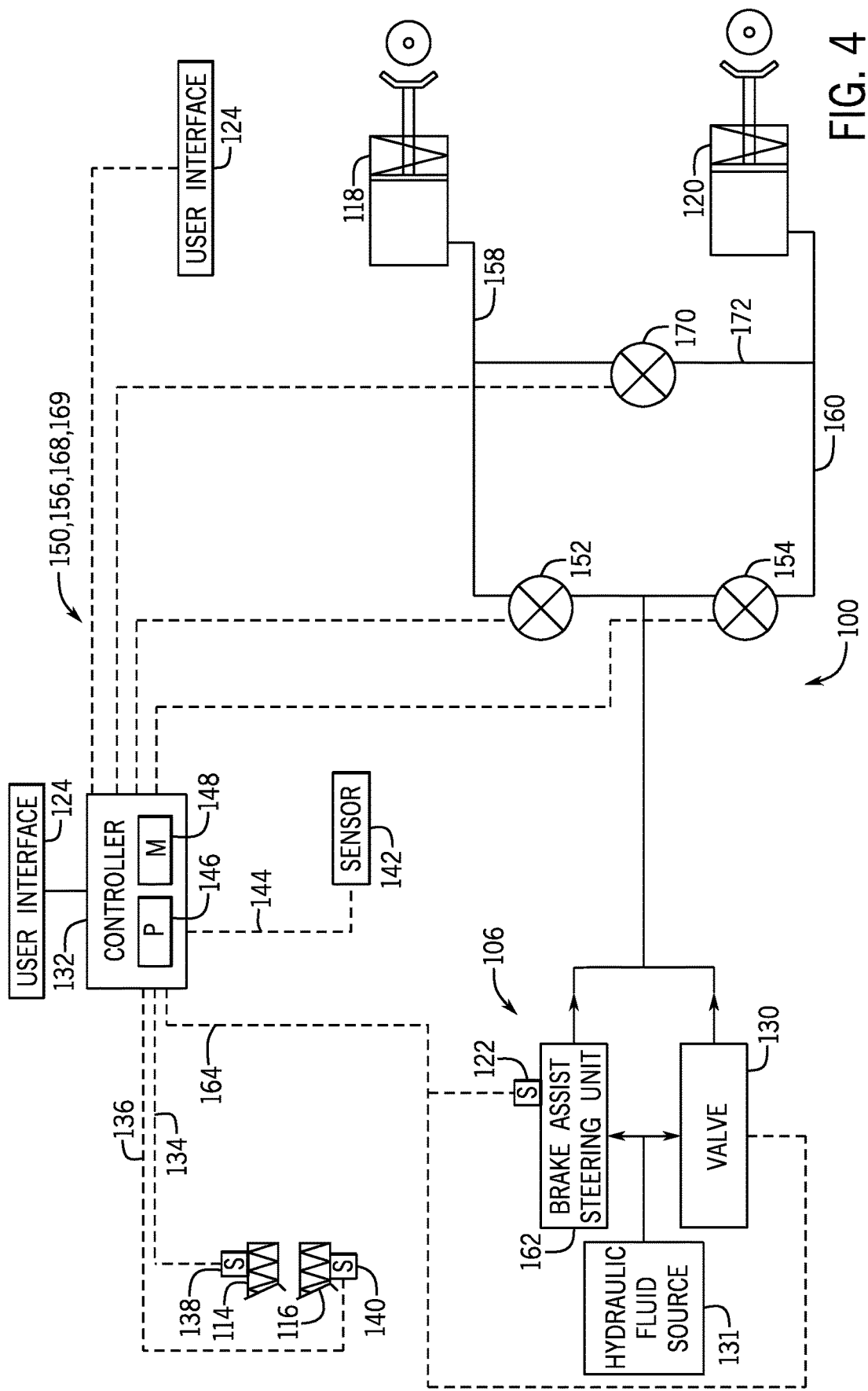
FIG. 4 is a schematic view of a further embodiment of an electro-hydraulic brake system.

FIG. 4 is a schematic view of a further embodiment of an electro-hydraulic brake system 100. The electro-hydraulic brake system 100 is similar to that illustrated in FIG. 3, but instead of actuating the valve 130 with the first and second brake inputs 114, 116; the valve 130 is electronically actuated by the controller 132. As explained above, the sensors 138 and 140 are coupled to the first and second brake inputs 114, 116 (e.g., brake pedals). These sensors 138 and 140 send respective signals 134, 136 indicative of the actuation of the first and second brake inputs 114, 116. However, instead of the first and second brake inputs 114, 116 manually actuating the valve 130, the controller 132 uses the signals 134, 136 from the sensors 138, 140 to control actuation of the valve 130 and thus actuation of the first and second brakes 118, 120.

While the embodiments disclosed herein may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The invention claimed is:

1. An electro-hydraulic brake system, comprising:
 a first brake input configured to generate a first brake input signal;
 a second brake input configured to generate a second brake input signal;
 a master valve coupled to the first brake input and to the second brake input, wherein the master valve is configured to release hydraulic fluid in response to the first brake input signal or the second brake input signal;
 a first valve downstream from the master valve and configured to release the hydraulic fluid in response to the first brake input signal to control a first brake;
 a second valve downstream from the master valve and configured to release the hydraulic fluid in response to the second brake input signal to control a second brake;
 a speed sensor configured to generate a speed signal indicative of a speed of a work vehicle; and
 a controller comprising a processor and a memory device, wherein the controller is configured to receive the speed signal, the first brake input signal, and the second brake input signal, determine the speed of the work vehicle based on the speed signal, and to compare the speed of the work vehicle to a threshold speed, and wherein the controller is configured to synchronize actuation of the first and second valves in response to the speed being in excess of the threshold speed to control the first and second valves.

2. The system of claim 1, wherein the first brake input comprises a first brake pedal and the second brake input comprises a second brake pedal.

3. The system of claim 1, wherein the first and second valves are solenoid valves.

4. The system of claim 3, comprising a first flow path between the first solenoid valve and the first brake.

5. The system of claim 4, comprising a second flow path between the second solenoid valve and the second brake.

6. The system of claim 5, comprising a third valve fluidly coupled to the first flow path and to the second flow path, wherein the third valve is configured to control a flow of hydraulic fluid between the first and second flow paths in response to the first or second valve failing to open.

7. The system of claim 6, wherein the controller is configured to open and close the third valve to equalize hydraulic pressure between the first and second flow paths.

8. The system of claim 1, further comprising a steering unit configured to generate a steering signal, wherein the controller is configured open and/or close the first and second valves in response to the steering signal to control actuation of the first and second brakes.

9. The system of claim 1, wherein the first brake is on a left side of the work vehicle and the second brake is on a right side of the work vehicle.

10. The system of claim 1, wherein the first and second brake inputs couple to a spool valve that releases hydraulic fluid to the first and second valves in response to actuation of the first and second brake inputs.

11. An electro-hydraulic brake system, comprising:
a first valve configured to release hydraulic fluid to control a first brake;
a second valve configured to release the hydraulic fluid to control a second brake;
a spool valve upstream from and fluidly coupled to the first valve and to the second valve, wherein the spool valve is configured to release the hydraulic fluid to the first and/or second valves in response to a respective first brake input and a second brake input; and
a controller comprising a processor and a memory device, wherein the controller is configured to receive a first brake input signal and a second brake input signal and to open and/or close the first and second valves in response to the respective first and second brake input signals.

12. The system of claim 11, comprising a speed sensor configured to generate a speed signal indicative of a speed of a work vehicle.

13. The system of claim 12, wherein the controller receives the speed signal, determines the speed of the work vehicle, and compares the speed of the work vehicle to a threshold speed, and wherein the controller synchronizes actuation of the first and second valves in response to the speed being in excess of the threshold speed.

14. The system of claim 11, comprising the first brake input configured to generate the first brake input signal, wherein the controller uses the first brake input signal to control the first brake.

15. The system of claim 14, wherein the first brake is on a left side of a work vehicle and the first brake input is a brake pedal.

16. The system of claim 11, comprising the second brake input configured to generate the second brake input signal, wherein the controller uses the second brake input signal to control the second brake.

17. The system of claim 16, wherein the second brake is on a right side of a work vehicle and the second brake input is a brake pedal.

18. The system of claim 11, comprising a third solenoid valve, wherein the controller is configured to open and close the third solenoid valve to equalize hydraulic pressure between a first and second flow paths, and wherein the first flow path delivers hydraulic fluid to the first brake and the second flow path delivers hydraulic fluid to the second brake.

19. At least one tangible non-transitory computer readable medium comprising instructions for a work vehicle controller, the instructions comprising:
selectively receive a first brake input signal and second brake input signal from a respective first brake input and a second brake input;
actuate a master valve in response to the first brake input signal and the second brake input signal to release a fluid;
actuate a first valve downstream from the master valve in response to receiving the first brake input signal, wherein the first valve is configured to release the fluid to drive a first brake;
actuate a second valve downstream from the master valve in response to receiving the second brake input signal, wherein the second valve is configured to release the fluid to drive a second brake;
determine if a speed of a work vehicle is above a threshold speed; and
synchronize actuation of the first and second valves to simultaneously actuate a first brake and a second brake in response to the speed of the work vehicle being in excess of the threshold speed.

20. The tangible non-transitory computer readable medium of claim 19, comprising instructions to actuate a third valve to equalize pressure between a first flow path and a second flow path in response to the first or second valve failing to open, wherein the first flow path delivers hydraulic fluid to the first brake and the second flow path delivers hydraulic fluid to the second brake.

* * * * *